United States Patent
Lin et al.

(10) Patent No.: US 11,132,031 B2
(45) Date of Patent: Sep. 28, 2021

(54) ELECTRONIC DEVICE

(71) Applicants: Che-Hsien Lin, Taipei (TW); Che-Hsien Chu, Taipei (TW); Ko-Yen Lu, Taipei (TW); Chun-Chieh Chen, Taipei (TW); Chen-Ming Lee, Taipei (TW); Yi-Hung Chen, Taipei (TW); I-Chien Huang, Taipei (TW)

(72) Inventors: Che-Hsien Lin, Taipei (TW); Che-Hsien Chu, Taipei (TW); Ko-Yen Lu, Taipei (TW); Chun-Chieh Chen, Taipei (TW); Chen-Ming Lee, Taipei (TW); Yi-Hung Chen, Taipei (TW); I-Chien Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/921,961

(22) Filed: Jul. 7, 2020

(65) Prior Publication Data
US 2021/0011525 A1 Jan. 14, 2021

Related U.S. Application Data

(60) Provisional application No. 62/873,177, filed on Jul. 11, 2019.

(51) Int. Cl.
*G06F 1/16* (2006.01)
(52) U.S. Cl.
CPC ............ *G06F 1/1681* (2013.01); *G06F 1/165* (2013.01); *G06F 1/1616* (2013.01)
(58) Field of Classification Search
CPC ...... G06F 1/1616; G06F 1/1624; G06F 1/165; G06F 1/1681; G06F 1/1692
See application file for complete search history.

(56) References Cited

U.S. PATENT DOCUMENTS 6,073,187 A * 6/2000 Jacobs .................. G06F 1/1616
361/679.27
6,404,623 B1 * 6/2002 Koshika ................ G06F 1/1616
345/87

(Continued)

FOREIGN PATENT DOCUMENTS

| CN | 205639268 | 10/2016 |
| TW | 200638181 | 11/2006 |

OTHER PUBLICATIONS

"Office Action of Taiwan Counterpart Application", dated Jul. 21, 2021, p. 1-p. 7.

*Primary Examiner* — Anthony Q Edwards
(74) *Attorney, Agent, or Firm* — JCIPRNET

(57) ABSTRACT

An electronic device including a first body, a second body, a hinge structure, an electronic assembly and a linkage mechanism is provided. The first body and the second body are pivoted to each other through the hinge structure. The electronic assembly is disposed on the first body. The linkage mechanism is disposed in the first body and connected between the hinge structure and the electronic assembly. When the second body is closed to the first body, the electronic assembly is hidden between the first body and the second body. When the second body is opened relative to the first body with an opening angle less than a predetermined angle, the hinge structure does not drive the linkage mechanism. When the second body is opened relative to the first body with the opening angle not less than the predetermined angle, the hinge structure drives the linkage mechanism and the linkage mechanism drives the electronic assembly to be opened relative to the first body.

10 Claims, 12 Drawing Sheets

(56) References Cited

U.S. PATENT DOCUMENTS

| | | | |
|---|---|---|---|
| 10,788,854 B1 * | 9/2020 | Liang | G06F 1/1616 |
| 2009/0244016 A1 * | 10/2009 | Casparian | G06F 1/1692 |
| | | | 345/173 |
| 2012/0127652 A1 * | 5/2012 | Lin | G06F 1/203 |
| | | | 361/679.46 |
| 2012/0274565 A1 * | 11/2012 | Moser | G06F 1/1662 |
| | | | 345/168 |
| 2017/0255320 A1 * | 9/2017 | Kumar | G06F 1/1616 |
| 2018/0188774 A1 * | 7/2018 | Ent | G06F 1/1618 |
| 2018/0373292 A1 * | 12/2018 | Perelli | G06F 1/165 |
| 2020/0081506 A1 * | 3/2020 | Morino | G06F 1/203 |
| 2020/0124229 A1 * | 4/2020 | Han | H04M 1/0216 |
| 2020/0264672 A1 * | 8/2020 | Morino | G06F 1/203 |

* cited by examiner

ELECTRONIC DEVICE

CROSS-REFERENCE TO RELATED APPLICATION

This application claims the priority benefit of U.S. provisional application No. 62/873,177, filed on Jul. 11, 2019. The entirety of the above-mentioned patent application is hereby incorporated by reference herein and made a part of this specification.

TECHNICAL FIELD

The invention relates to an electronic device, and more particularly, to an electronic device having bodies that can be opened and closed relative to each other.

BACKGROUND

With the popularity and development of notebook computers, consumers are increasingly demanding convenience and versatility in operation. In some notebook computers, an auxiliary screen is disposed between a host and a main screen to provide consumers with additional display and operation functions. In an opened state of the notebook computer, the auxiliary screen needs to be flipped or lifted accordingly for the user to view and operate. However, if the auxiliary screen is designed to be flipped or lifted as the main screen is opened, when a space between the main screen and the host is insufficient due to an opening angle of the main screen being smaller, the auxiliary screen does not have enough space to be flipped or lifted. Consequently, due to the interference with the main screen, the auxiliary screen cannot be flipped or lifted.

SUMMARY

The invention provides an electronic device whose electronic assembly can be smoothly flipped and lifted without interfering with the bodies.

The electronic device of the invention includes a first body, a second body, a hinge structure, an electronic assembly and a linkage mechanism. The first body and the second body are pivoted to each other through the hinge structure. The electronic assembly is disposed on the first body. The linkage mechanism is disposed in the first body and connected between the hinge structure and the electronic assembly. When the second body is closed to the first body, the electronic assembly is hidden between the first body and the second body. When the second body is opened relative to the first body with an opening angle less than a predetermined angle, the hinge structure does not drive the linkage mechanism. When the second body is opened relative to the first body with the opening angle not less than the predetermined angle, the hinge structure drives the linkage mechanism and the linkage mechanism drives the electronic assembly to be opened relative to the first body.

In an embodiment of the invention, the electronic assembly has a first end and a second end opposite to each other; when the second body is closed to the first body, a distance between the second end and the hinge structure is less than a distance between the first end and the hinge structure; when the second body is opened relative to the first body with the opening angle not less than the predetermined angle, the second end is lifted relative to the first end.

In an embodiment of the invention, when the second body is opened relative to the first body with the opening angle not less than the predetermined angle, the second end moves towards the second body along a surface of the first body.

In an embodiment of the invention, the hinge structure includes a first rotating shaft and a second rotating shaft; the first rotating shaft is connected to the first body; the second rotating shaft is connected to the second body and has a cam; the linkage mechanism is adapted to be driven by the cam.

In an embodiment of the invention, an end of the linkage mechanism is slidably disposed on the hinge structure; when the second body is opened relative to the first body with the opening angle less than the predetermined angle, the cam does not push the end; when the second body is opened relative to the first body with the opening angle not less than the predetermined angle, the cam pushes the end.

In an embodiment of the invention, the end of the linkage mechanism is slidably disposed on the hinge structure along an axial direction of the hinge structure, and the cam is adapted to push the end of the linkage mechanism to move along the axial direction.

In an embodiment of the invention, the electronic device includes a frame body and a guide rail, the guide rail is disposed in the first body, the frame body carries the electronic assembly and is slidably disposed on the guide rail, an end of the linkage mechanism is connected to the frame body and adapted to drive the frame body to move along the guide rail.

In an embodiment of the invention, the guide rail has at least one inclined section.

In an embodiment of the invention, the linkage mechanism includes a plurality of link rods sequentially connected.

In an embodiment of the invention, the second body has as a main screen, and the electronic assembly has an auxiliary screen.

Based on the above, the hinge structure of the invention is designed to drive the linkage mechanism only when the opening angle of the second body is not less than the predetermined angle. Accordingly, when the opening angle of the second body is relatively small, the linkage mechanism will not drive the electronic assembly to be opened relative to the first body so as to prevent the electronic assembly from interfering with the second body due to insufficient moving space. Once the second body has a larger opening angle, the hinge structure drives the electronic assembly to move through the linkage mechanism so that the electronic assembly can be successfully flipped and lifted.

DETAILED DESCRIPTION

Figure 1A:
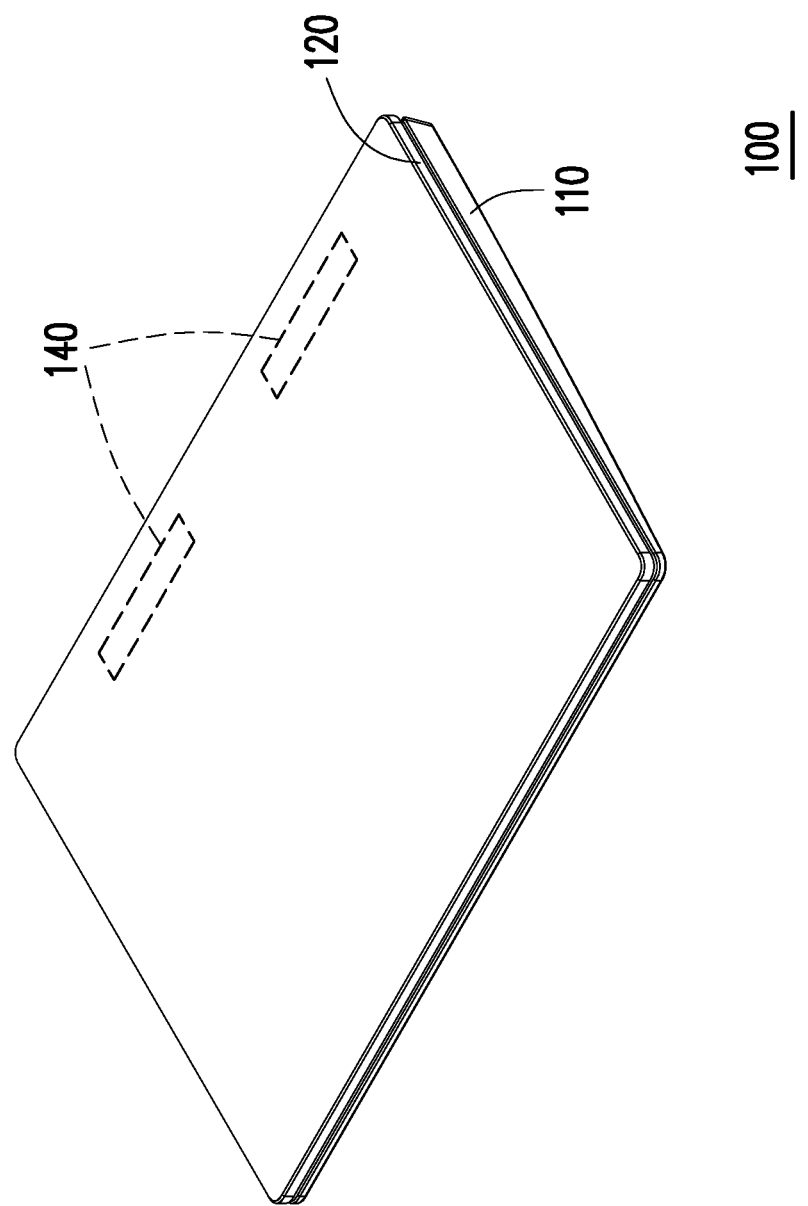
FIG. 1A to FIG. 1C are operation flow diagrams of an electronic device according to an embodiment of the invention.
Figure 1B:
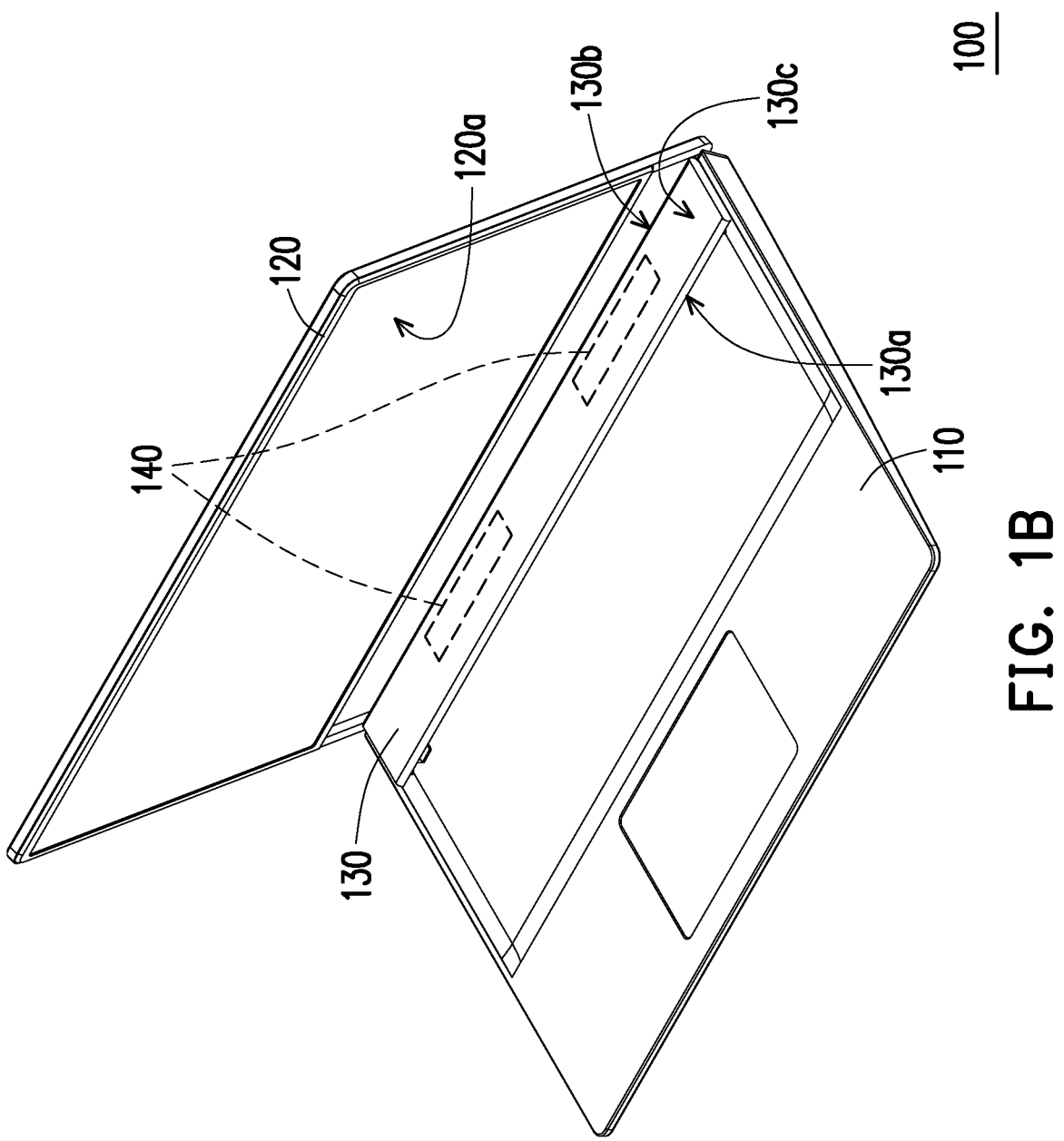
Figure 1C:
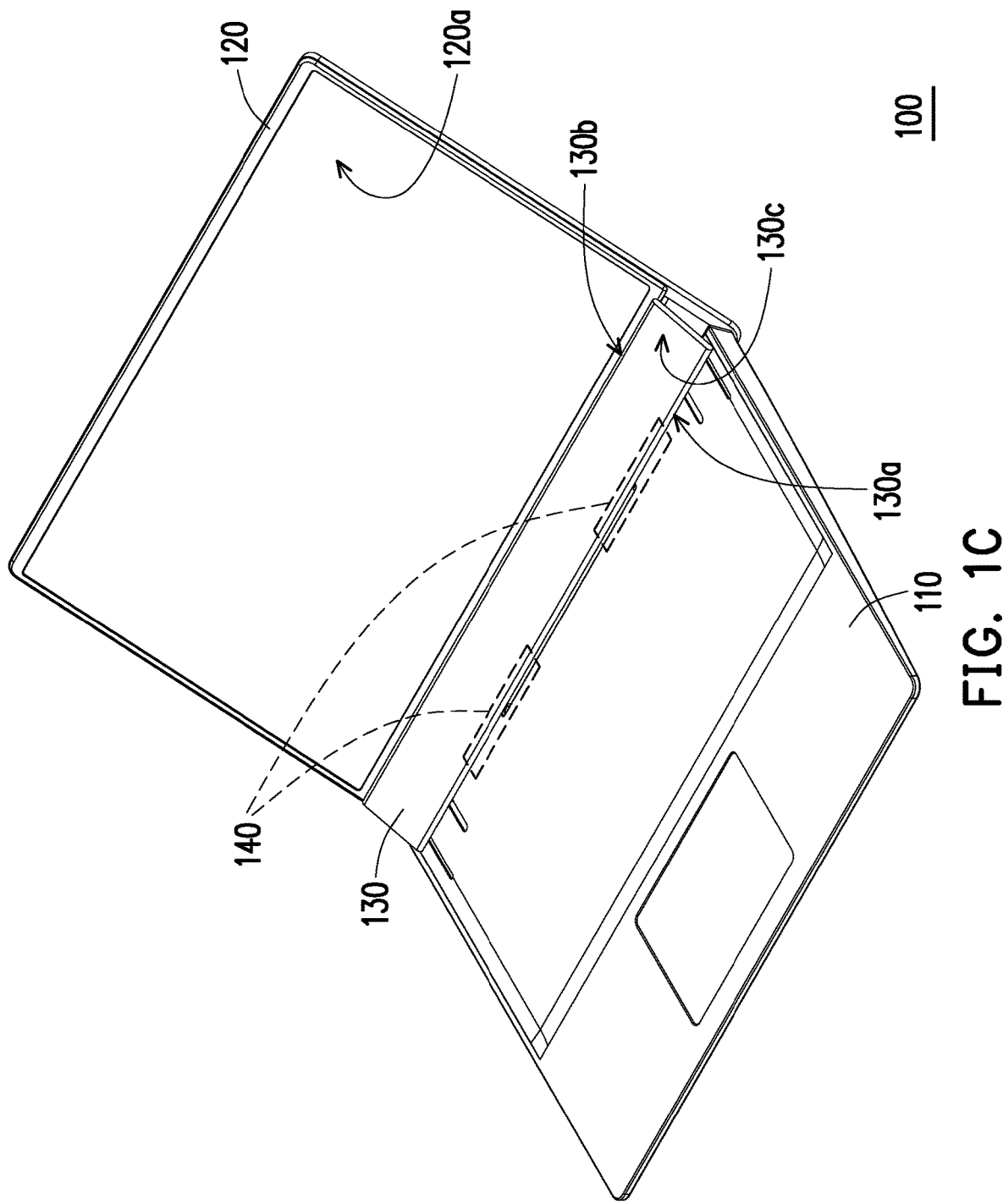

FIG. 1A to FIG. 1C are operation flow diagrams of an electronic device according to an embodiment of the invention. Referring to FIG. 1A to FIG. 1C, an electronic device 100 of this embodiment is, for example, a notebook computer and includes a first body 110, a second body 120, at least one hinge structure 140 (shown as two) and an electronic assembly 130. The first body 110 and the second body 120 are, for example, a host and a display of the notebook computer, and are pivoted to each other through the hinge structure 140. The second body 120 has as a main screen 120a, and the electronic assembly 130 is disposed on the first body 110 and has an auxiliary screen 130c. The second body 120 may be opened relative to the first body 110 as shown in FIG. 1A to FIG. 1C, and the electronic assembly 130 may be opened relative to the first body 110 as shown in FIG. 1B to FIG. 1C. The auxiliary screen 130c may be a touch screen or a non-touch screen, which is not limited in the invention. Further, in other embodiments, the electronic assembly 130 may be a functional component such as a speaker, a touchpad, etc. The invention does not limit its type.

Figure 2A:
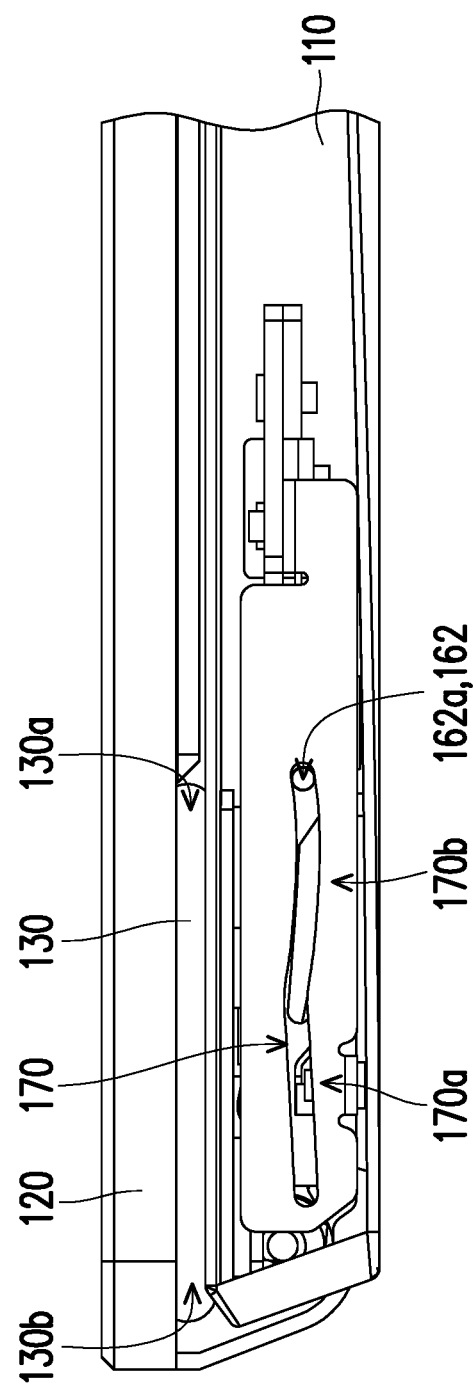
FIG. 2A to FIG. 2C are side views of partial structures of FIG. 1A to FIG. 1C.
Figure 2B:
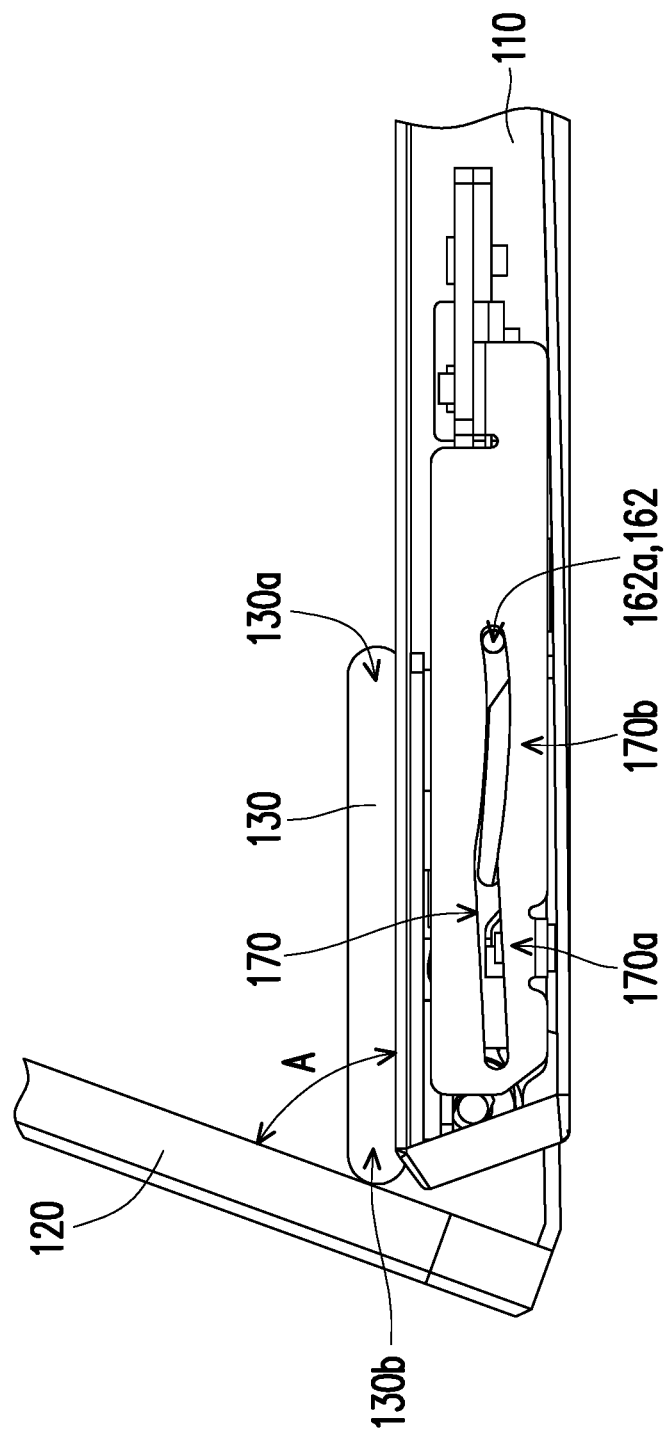
Figure 2C:
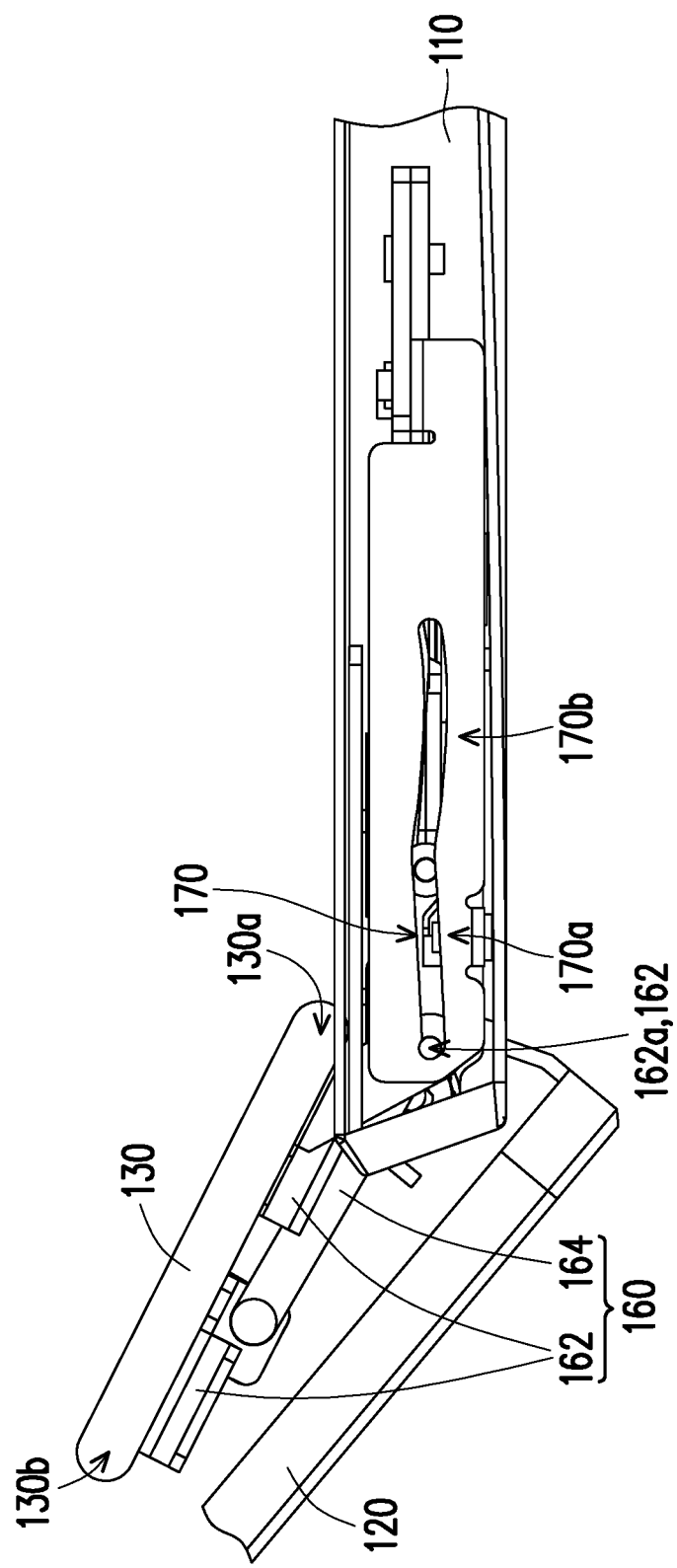
Figure 3A:
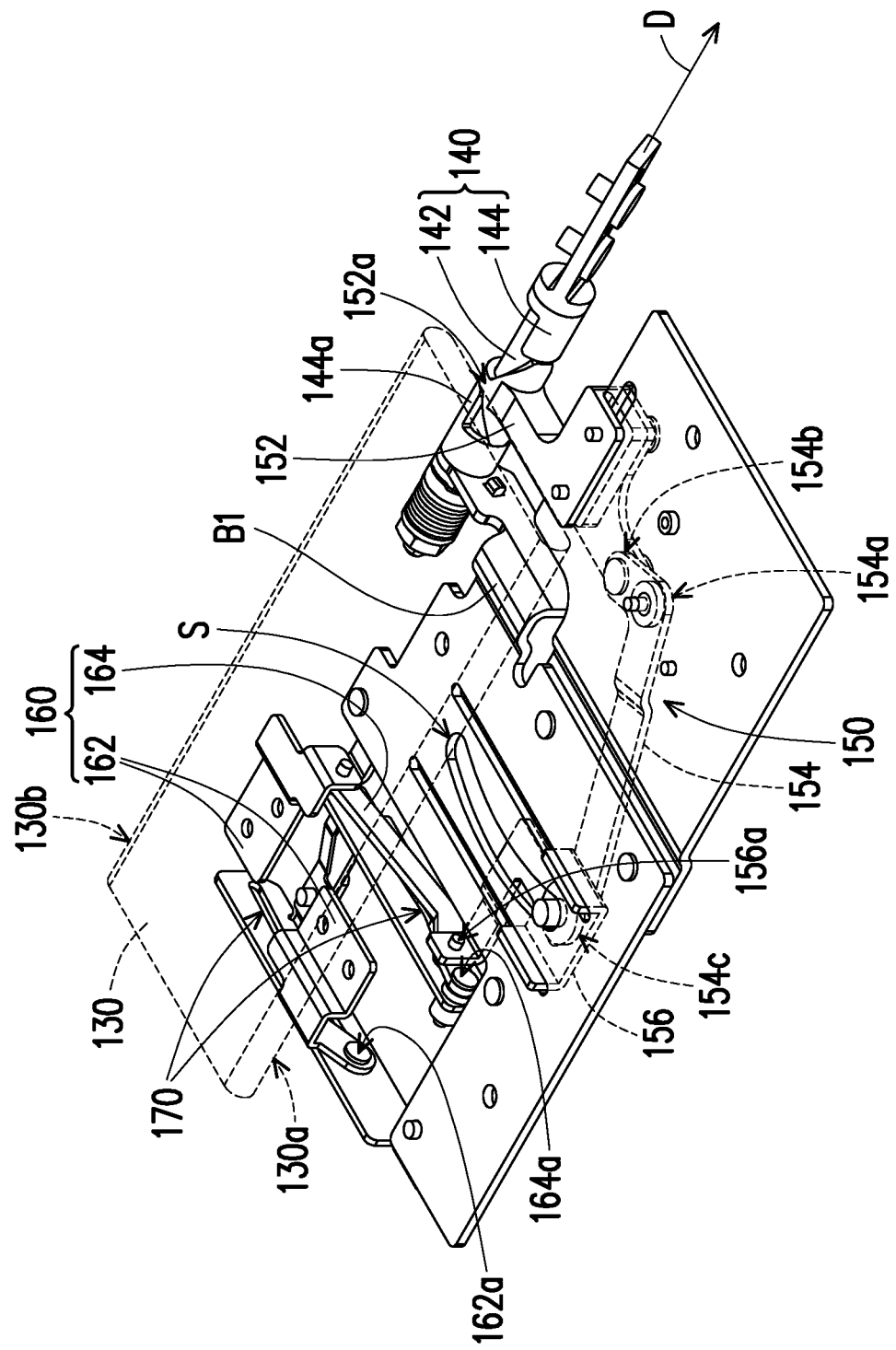
FIG. 3A to FIG. 3C are 3D views of partial structures of FIG. 1A to FIG. 1C.
Figure 3B:
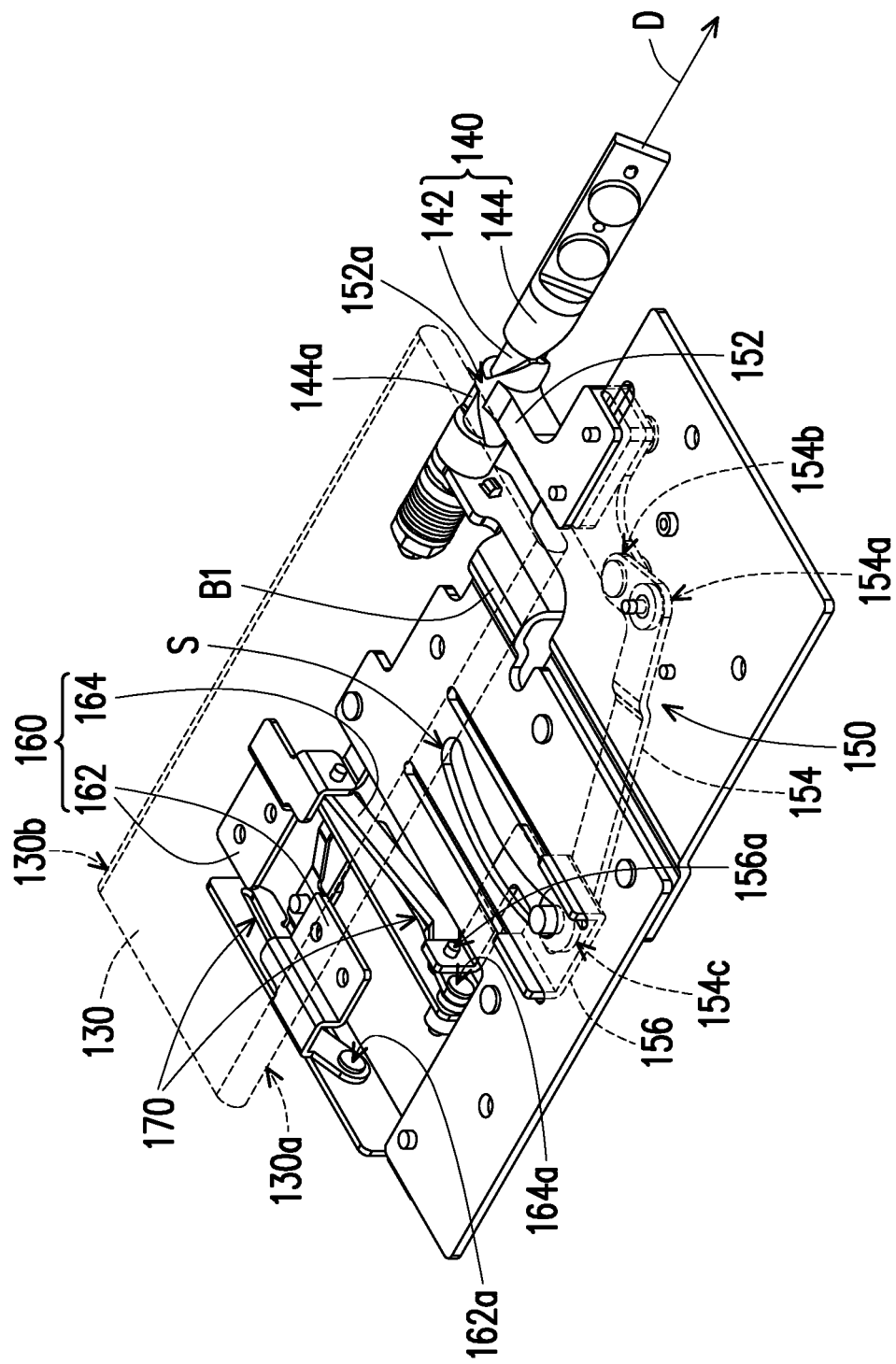
Figure 3C:
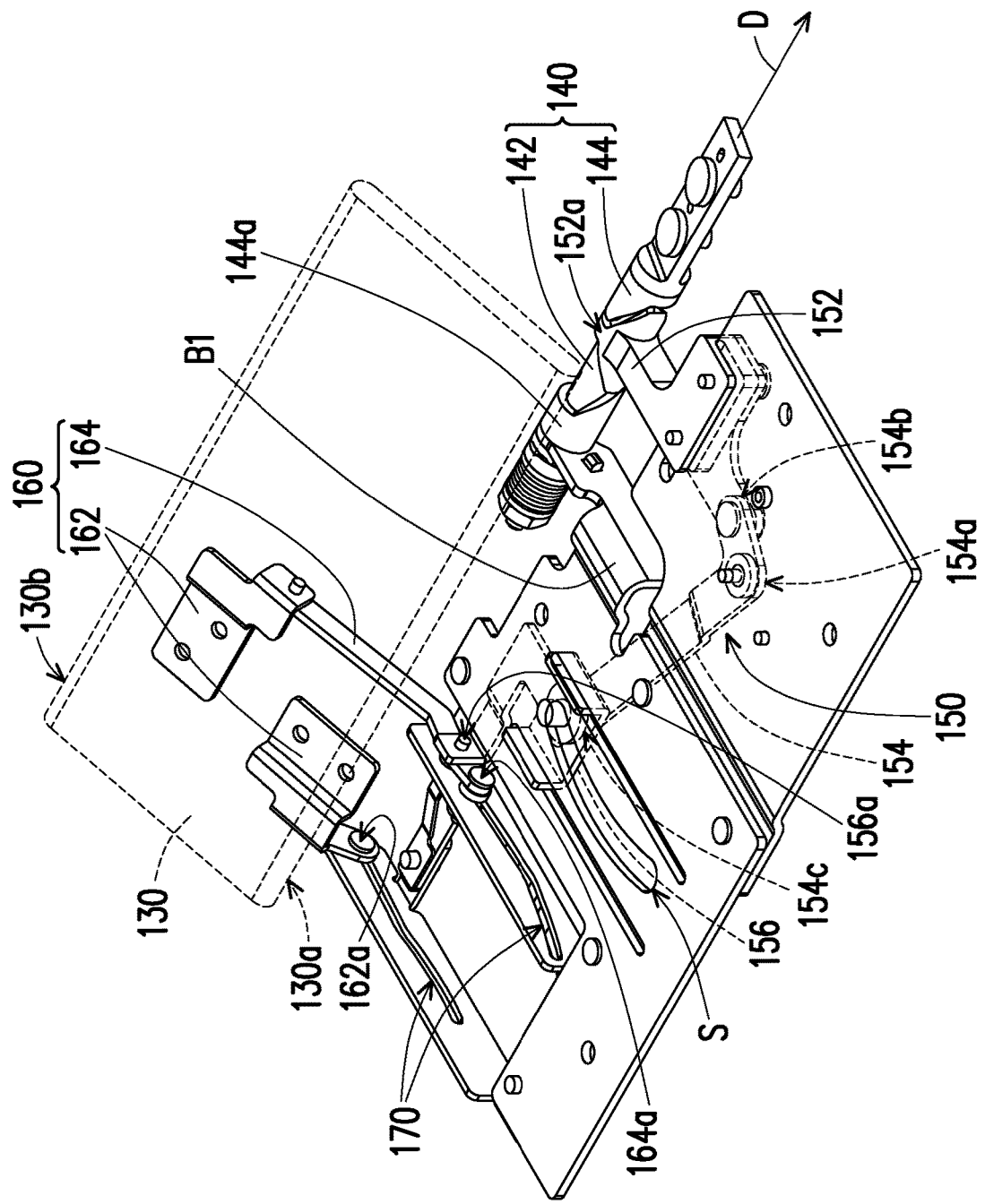

FIG. 2A to FIG. 2C are side views of partial structures of FIG. 1A to FIG. 1C. FIG. 3A to FIG. 3C are 3D views of partial structures of FIG. 1A to FIG. 1C. The electronic device 100 of this embodiment further includes a linkage mechanism 150 (labeled in FIG. 3A to FIG. 3C). The linkage mechanism 150 is disposed in the first body 110 and connected between the hinge structure 140 and the electronic assembly 130. When the second body 120 is closed to the first body 110 as shown in FIG. 2A, the electronic assembly 130 is hidden between the first body 110 and the second body 120. When the second body 120 is opened relative to the first body 110 with an opening angle less than a predetermined angle (an included angle A shown in FIG. 2B, which is 70 degrees, for example) as shown in FIG. 2A to FIG. 2B, the hinge structure 140 does not drive the linkage mechanism 150 as shown in FIG. 3A to FIG. 3B. When the second body 120 is opened relative to the first body 110 with the opening angle not less than the predetermined angle (the included angle A shown in FIG. 2B) as shown in FIG. 2B to FIG. 2C, the hinge structure 140 drives the linkage mechanism 150 and the linkage mechanism 150 drives the electronic assembly 130 to be opened relative to the first body 110 as shown in FIG. 3B to FIG. 3C.

Specifically, the electronic assembly 130 of this embodiment has a first end 130a and a second end 130b opposite to each other. When the second body 120 is closed to the first body 110 as shown in FIG. 1A and FIG. 2A, a distance between the second end 130b and the hinge structure 140 is less than a distance between the first end 130a and the hinge structure 140. When the second body 120 is opened relative to the first body 110 with the opening angle not less than the predetermined angle, the electronic assembly 130 is driven by the linkage mechanism 140 to be flipped. Accordingly, the second end 130b is lifted relative to the first end 130a, and the second end 130b of the electronic assembly 130 moves towards the second body 120 along a surface of the first body 110 to a state shown in FIG. 2C. In other embodiments, when the second body 120 is opened relative to the first body 110 with the opening angle not less than the predetermined angle, the electronic assembly 130 may be driven by the linkage mechanism 140 to be flipped or lifted in other manners, which are not limited by the invention.

As described above, the hinge structure 140 of this embodiment is designed to drive the linkage mechanism 150 to move only when the opening angle of the second body 120 is not less than the predetermined angle. Accordingly, when the opening angle of the second body 120 is relatively small, the linkage mechanism 150 will not drive the electronic assembly 130 to be opened relative to the first body 110 so as to prevent the electronic assembly 130 from interfering with the second body 120 due to insufficient moving space. Once the second body 120 has a larger opening angle, the hinge structure 140 drives the electronic assembly 130 to move through the linkage mechanism 150 so that the electronic assembly 130 can be successfully flipped and lifted.

Figure 4A:
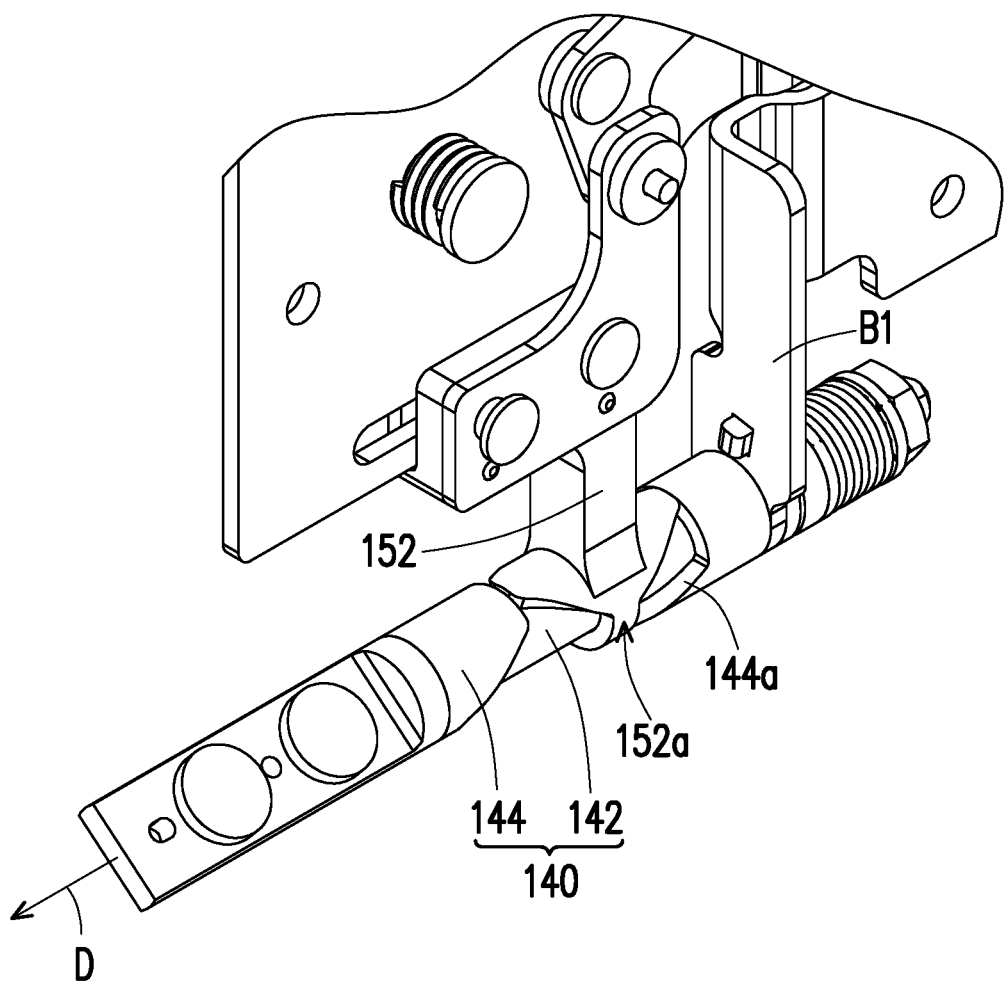
FIG. 4A to FIG. 4C are 3D views of the hinge structure and a part of the linkage mechanism of FIG. 3A to FIG. 3C from another perspective.
Figure 4B:
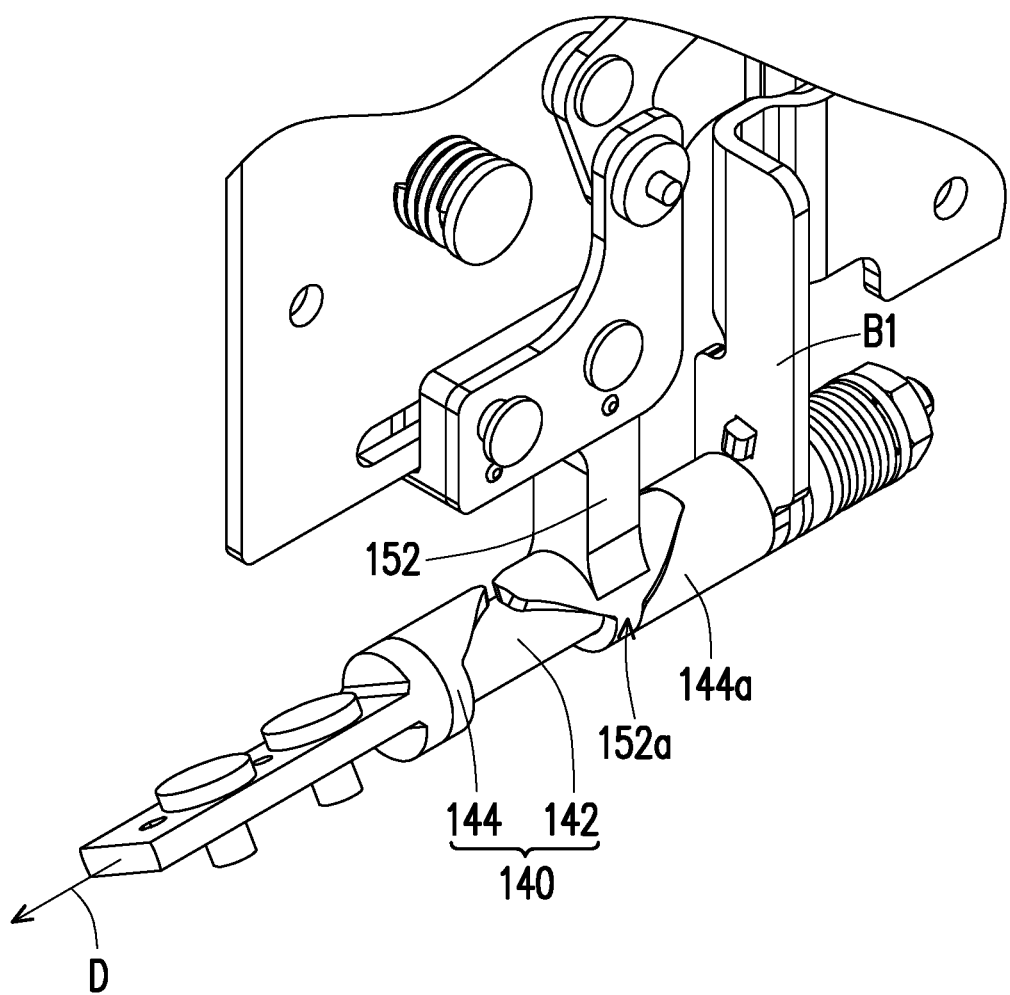
Figure 4C:
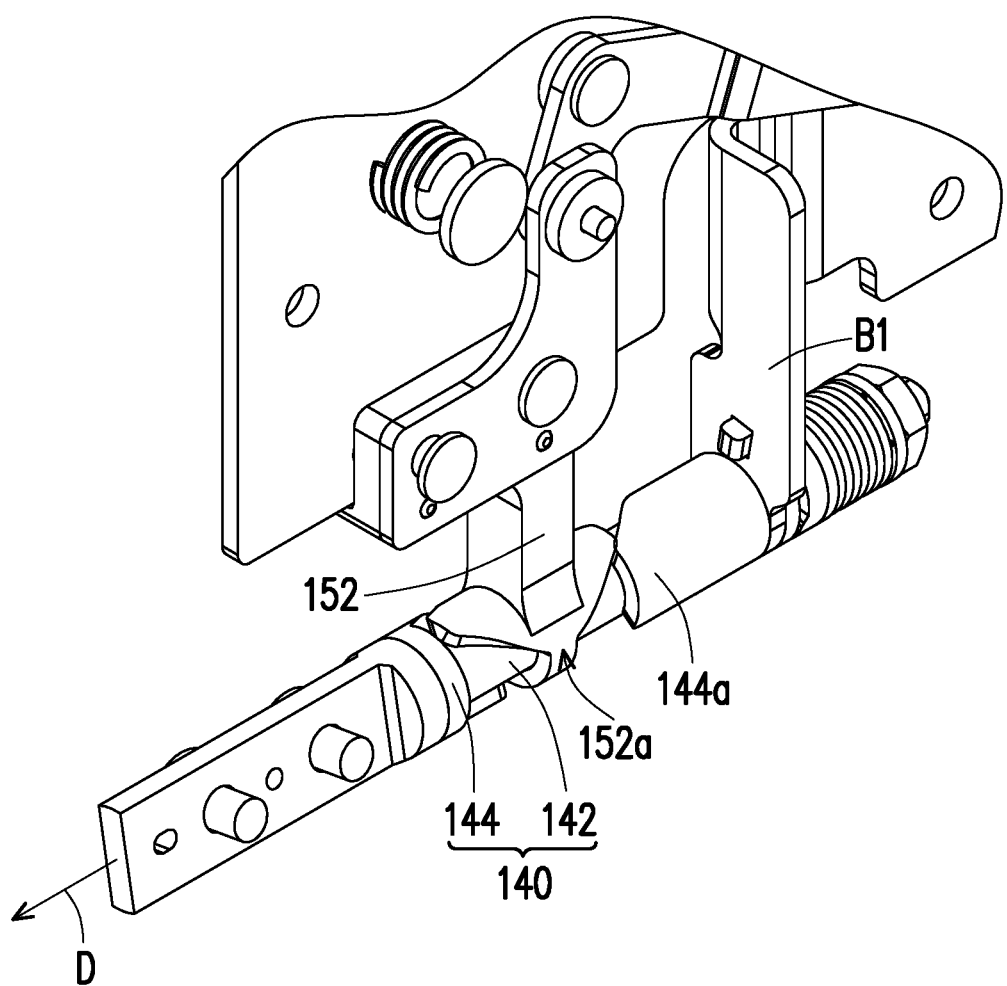

A connection and an operating method of the hinge structure and the linkage mechanism of this embodiment will be described in detail below. FIG. 4A to FIG. 4C are 3D views of the hinge structure and a part of the linkage mechanism of FIG. 3A to FIG. 3C from another perspective. The hinge structure 140 of this embodiment includes a first rotating shaft 142 and a second rotating shaft 144 as shown in FIG. 3A and FIG. 4A. The first rotating shaft 142 is connected to the first body 110 through a frame body B 1. The second rotating shaft 144 is connected to the second body 120 and has a cam 144a. The first body 110 and the second body 120 may be opened or closed through a relative pivoting of the first rotating shaft 142 and the second rotating shaft 144.

The linkage mechanism 150 of this embodiment includes a plurality of link rods 152, 154 and 156 sequentially connected. An end 152a of the link rod 152 is slidably disposed on the first rotating shaft 142 of the hinge structure 140 along an axial direction D of the hinge structure 140. The link rod 154 is pivoted to the frame body B 1 through its pivot portion 154a. An end 154b of the link rod 154 is rotatably connected to the link rod 152. Another end 154c of the link rod 154 is rotatably and slidably connected to the link rod 156 and slidably connected to an arc groove S of the frame body B1. The electronic device 100 further includes a frame body 160 and at least one guide rail 170 (shown as two) as shown in FIG. 3A. The guide rails 170 are disposed in the first body 110, and the frame body 160 is composed of two brackets 162 and a rod piece 164. The two brackets 162 are used to carry the electronic assembly 130. The rod piece 164 is connected to one of the brackets 162 and slidably disposed on one of the guide rails 170 through its end 164a, and the other bracket 162 is slidably disposed on the other guide rail 170 through its end 162a to synchronize move with the end 164a of the rod piece 164 along the guide rails 170. An end 156a of the link rod 156 of the linkage mechanism is connected to the rod piece 164 of the frame body 160 and adapted to drive the end 164a of the rod piece 164 to move along the guide rail 170.

When the second body 120 is opened relative to the first body 110 with the opening angle less than the predetermined angle as shown in FIG. 2A to FIG. 2B, the cam 144a of the second rotating shaft 144 does not push the end 152a of the link rod 152 as shown in FIG. 4A to FIG. 4B. When the second body 120 is opened relative to the first body 110 with the opening angle not less than the predetermined angle as shown in FIG. 2B to FIG. 2C, the cam 144a of the second rotating shift 144 pushes the end 152a of the link rod 152 to move along the axial direction D as shown in FIG. 4B to FIG. 4C. At this time, the link rod 152 drives the link rod 154 and the link rod 156 to move as shown in FIG. 3B to FIG. 3C, so that the frame body 160 is driven by the link rod 156 to move along the guide rail 170, thereby driving the electronic assembly 130 to be flipped and lifted.

As shown by FIG. 2A to FIG. 2C, each of the guide rails 170 has at least one inclined section (shown as two inclined sections 170a and 170b). The end 164a of the rod piece 164 slidably disposed on one of the guide rails 170 and the end 164a of the bracket 162 slidably disposed on the other guide rail 170 are raised and lowered along with the inclined sections 170a and 170b. In addition, the end 156a of the link rod 156 only moves horizontally without moving up and down during operation. Therefore, when the link rod 156 drives the frame body 160 through its end 156a to move along the guide rail 170, an inclination angle of the frame body 160 will change accordingly so that the electronic assembly 130 may be flipped and lifted as shown in FIG. 2B to FIG. 2C. In other embodiments, an extension manner of the guide rail 170 may be changed according to requirements so that the electronic assembly 130 can be flipped and lifted in other suitable ways.

In summary, the hinge structure of the invention is designed to drive the linkage mechanism only when the opening angle of the second body is not less than the predetermined angle. Accordingly, when the opening angle of the second body is relatively small, the linkage mechanism will not drive the electronic assembly to be opened relative to the first body so as to prevent the electronic assembly from interfering with the second body due to insufficient moving space. Once the second body has a larger opening angle, the hinge structure drives the electronic assembly to move through the linkage mechanism so that the electronic assembly can be successfully flipped and lifted.

The invention claimed is:

1. An electronic device, comprising:
a first body;
a second body;
a hinge structure, the first body and the second body being pivoted to each other through the hinge structure;
an electronic assembly, disposed on the first body; and
a linkage mechanism, disposed in the first body and connected between the hinge structure and the electronic assembly, wherein when the second body is closed to the first body, the electronic assembly is hidden between the first body and the second body; when the second body is opened relative to the first body with an opening angle less than a predetermined angle, the hinge structure does not drive the linkage mechanism; when the second body is opened relative to the first body with the opening angle not less than the predetermined angle, the hinge structure drives the linkage mechanism and the linkage mechanism drives the electronic assembly to be opened relative to the first body.

2. The electronic device of claim 1, wherein the electronic assembly has a first end and a second end opposite to each other; when the second body is closed to the first body, a distance between the second end and the hinge structure is less than a distance between the first end and the hinge structure; when the second body is opened relative to the first body with the opening angle not less than the predetermined angle, the second end is lifted relative to the first end.

3. The electronic device of claim 2, wherein when the second body is opened relative to the first body with the opening angle not less than the predetermined angle, the second end moves towards the second body along a surface of the first body.

4. The electronic device of claim 1, wherein the hinge structure comprises a first rotating shaft and a second rotating shaft; the first rotating shaft is connected to the first body; the second rotating shaft is connected to the second body and has a cam; the linkage mechanism is adapted to be driven by the cam.

5. The electronic device of claim 4, wherein an end of the linkage mechanism is slidably disposed on the hinge structure; when the second body is opened relative to the first body with the opening angle less than the predetermined angle, the cam does not push the end; when the second body is opened relative to the first body with the opening angle not less than the predetermined angle, the cam pushes the end.

6. The electronic device of claim 5, wherein the end of the linkage mechanism is slidably disposed on the hinge structure along an axial direction of the hinge structure, and the cam is adapted to push the end of the linkage mechanism to move along the axial direction.

7. The electronic device of claim 1, comprising a frame body and a guide rail, wherein the guide rail is disposed in the first body, the frame body carries the electronic assembly and is slidably disposed on the guide rail, an end of the linkage mechanism is connected to the frame body and adapted to drive the frame body to move along the guide rail.

8. The electronic device of claim 7, wherein the guide rail has at least one inclined section.

9. The electronic device of claim 1, wherein the linkage mechanism comprises a plurality of link rods sequentially connected.

10. The electronic device of claim 1, wherein the second body has as a main screen, and the electronic assembly has an auxiliary screen.

* * * * *